(No Model.)
B. F. MERSSMANN.
WINDING INDICATOR FOR TIME PIECES.
No. 287,559. Patented Oct. 30, 1883.
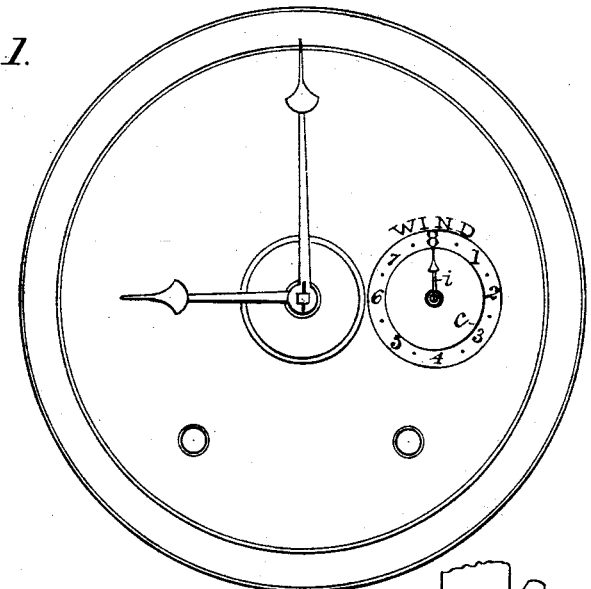
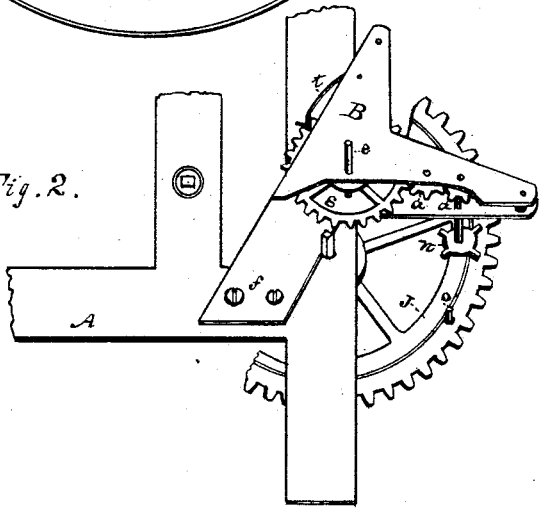
WITNESSES.
T. J. Price
Geo. W. Price
INVENTOR.
B. F. Merssmann

UNITED STATES PATENT OFFICE.

BARNEY F. MERSSMANN, OF MACOMB, ILLINOIS.

WINDING-INDICATOR FOR TIME-PIECES.

SPECIFICATION forming part of Letters Patent No. 287,559, dated October 30, 1883.

Application filed July 23, 1883. (No model.)

*To all whom it may concern:*

Be it known that I, BARNEY F. MERSSMANN, of Macomb, in the county of McDonough and State of Illinois, have invented a new and useful Winding-Indicator for Clocks and Watches; and I do hereby declare that the following is a full, clear, and exact description, which will enable others skilled in the art to make and use the same, reference being had to the accompanying drawings, and to the letters of reference marked thereon, in which—

Figure 1 is a plan of dial, and Fig. 2 is a perspective view, showing my invention attached to a common clock.

The nature and object of this invention is to construct a winding-indicator, to be placed in clocks or watches with a dial on the face that will indicate the hours or days that have passed since the clock or watch was wound up; and its novelty consists in suitable mechanism attached to the frame of the clock or watch, and a suitable dial on its face, and operated upon by the main or spring wheel, as will subsequently be fully described, and pointed out in the claim.

In the drawings, Fig. 1 represents a dial of a clock, detached from the works, which has a winding-indicator dial, c, on its face. In Fig. 2, A represents a part of the frame and works of clock, to which the frame B is attached, a part being cut away. In this frame is placed the wheel s and pinions a a. The shaft of the outer pinion extends down below the frame, and has attached to it the four-cogged wheel n. t represents a yielding spring-lock, which catches between the teeth of the wheel s and holds it sufficient to keep it from turning only when turned by means of the pin o in the wheel J. The pointer i is placed on the shaft e of the wheel s.

Operation: The wheel J, being the mainspring drive-wheel, has two studs, o, directly opposite each other in its rim, and when the wheel revolves the stud o comes in contact with one of the teeth in the wheel n and turns it one-fourth round, and by means of the pinions a a, which gear into the wheel s, turns it the distance of two cogs, which turns the pointer to the dot indicating twelve hours, it being half the distance between the numerals. The stud o on the opposite side then comes in contact with the wheel n and turns it another quarter round, and turns the wheel s the same as before, which brings the pointer i to the figure 1 on the dial c, indicating twenty-four hours, or that one day has passed since the clock has been wound, and the same movements are made each day until the figure 8 is reached by the pointer, and above which the word "Wind" is placed, showing that it has been eight days since the clock has been wound up. After winding, the pointer i should be turned to its shown position, if not at that position at that time of winding.

Having thus fully described my invention, what I claim as new, and desire to secure by Letters Patent, is—

In winding-indicators for clocks and watches, the combination, with the dial c, having figures representing hours or days, of the pointer i, wheel s, having extended shaft e, pinions a a, four-cog wheel n, and mainspring-wheel J, having studs o, substantially as shown and described, for the purpose specified.

B. F. MERSSMANN.

Witnesses:
T. J. PRICE,
GEO. W. PRICE.